(12) United States Patent
Miyoshi et al.

(10) Patent No.: US 8,294,311 B2
(45) Date of Patent: Oct. 23, 2012

(54) ELECTRIC MOTOR AND ELECTRIC POWER STEERING APPARATUS

(75) Inventors: Takashi Miyoshi, Saitama (JP); Yasuo Shimizu, Saitama (JP); Atsuhiko Yoneda, Saitama (JP); Katsuhiro Saito, Saitama (JP); Ryoji Toyofuku, Saitama (JP); Katsuji Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/714,158

(22) Filed: Mar. 6, 2007

(65) Prior Publication Data
US 2007/0205680 A1 Sep. 6, 2007

(30) Foreign Application Priority Data

Mar. 6, 2006 (JP) ................. 2006-058859

(51) Int. Cl.
*H02K 5/16* (2006.01)
*H02K 7/08* (2006.01)
*H02K 7/06* (2006.01)
*H02K 7/10* (2006.01)

(52) U.S. Cl. ......... 310/90; 310/83; 310/89; 310/156.01; 384/493; 384/517; 384/518; 384/536; 74/388 PS; 74/425

(58) Field of Classification Search ............ 310/83, 310/89, 90, 51; 384/493, 517, 518, 536; 360/265.2; 74/425, 388 PS; *H02K 5/16, H02K 7/06, 7/08, 7/10*
See application file for complete search history.

(56) References Cited

U.S. PATENT DOCUMENTS

| 2,588,636 | A | * | 3/1952 | Korsgren | 384/536 |
| 2,859,033 | A | * | 11/1958 | Rose | 267/153 |
| 3,239,701 | A | * | 3/1966 | Campbell | 310/112 |
| 3,492,517 | A | * | 1/1970 | Tokuiti | 310/89 |
| 3,594,051 | A | * | 7/1971 | Wells | 384/517 |
| 4,231,739 | A | * | 11/1980 | Iudica | 433/126 |
| 4,575,926 | A | * | 3/1986 | McMinn | 29/598 |
| 4,696,587 | A | * | 9/1987 | Nishida et al. | 384/536 |
| 4,791,330 | A | * | 12/1988 | Charbonnier et al. | 310/105 |
| 5,006,747 | A | * | 4/1991 | Stewart, Sr. | 310/239 |
| 5,117,143 | A | * | 5/1992 | Iddings | 310/191 |
| 5,172,465 | A | * | 12/1992 | Stewart, Sr. | 29/597 |
| 5,198,981 | A | * | 3/1993 | Collier-Hallman et al. | 701/42 |
| 5,406,180 | A | * | 4/1995 | Feller, Jr. | 318/372 |
| 5,482,381 | A | * | 1/1996 | Krum et al. | 384/480 |
| 5,675,202 | A | * | 10/1997 | Zenmei et al. | 310/100 |
| 5,726,511 | A | * | 3/1998 | Kusase et al. | 310/90 |

(Continued)

FOREIGN PATENT DOCUMENTS

GB 934181 11/1959

(Continued)

*Primary Examiner* — John K Kim
(74) *Attorney, Agent, or Firm* — Arent Fox LLP

(57) ABSTRACT

An electric motor having a rotation shaft includes a motor housing into which the electric motor is accommodated, at least one pair of rolling bearings positioned in the motor housing and rotatably supporting both ends of the rotation shaft, and a displacement restriction member provided inside the motor housing and restricting a displacement of the rolling bearing in an axial direction of the rolling bearing. Each rolling bearing includes an inner race, an outer race, and rolling elements rotatably supported between the inner race and the outer race. The inner race is press fitted without any gaps onto an outer peripheral surface of the rotation shaft, and the outer race is press fitted without any gaps into a bearing attachment portion provided inside the motor housing.

5 Claims, 13 Drawing Sheets

U.S. PATENT DOCUMENTS

| | | | |
|---|---|---|---|
| 5,811,902 A * | 9/1998 | Sato | 310/90 |
| 5,975,764 A * | 11/1999 | Okada et al. | 384/476 |
| 5,977,673 A | 11/1999 | Iwata | |
| 6,135,641 A * | 10/2000 | Smith | 384/493 |
| 6,280,095 B1 * | 8/2001 | Furukoshi et al. | 384/489 |
| 6,307,292 B1 * | 10/2001 | Brown | 310/90 |
| 6,366,000 B1 * | 4/2002 | Higashino et al. | 310/260 |
| 6,700,269 B2 * | 3/2004 | Torii et al. | 310/154.08 |
| 6,747,383 B2 * | 6/2004 | Tornquist et al. | 310/91 |
| 6,897,588 B2 * | 5/2005 | Okubo | 310/156.36 |
| 6,939,052 B1 * | 9/2005 | Hull | 384/535 |
| 6,952,061 B2 * | 10/2005 | Mogi et al. | 310/90 |
| 7,237,962 B2 * | 7/2007 | Zernikow et al. | 384/518 |
| 2001/0045784 A1 * | 11/2001 | Niimi et al. | 310/85 |
| 2002/0121401 A1 | 9/2002 | Shimizu et al. | |
| 2002/0195893 A1 * | 12/2002 | Kobayashi et al. | 310/83 |
| 2003/0164654 A1 * | 9/2003 | Thaxton et al. | 310/90.5 |
| 2003/0189382 A1 * | 10/2003 | Tornquist et al. | 310/90 |
| 2003/0190583 A1 * | 10/2003 | Kuhn | 433/131 |
| 2003/0209382 A1 * | 11/2003 | Hama et al. | 180/444 |
| 2003/0222525 A1 * | 12/2003 | Rapp et al. | 310/90 |
| 2004/0113506 A1 * | 6/2004 | Okubo | 310/156.43 |
| 2004/0178693 A1 * | 9/2004 | Burgbacher | 310/217 |
| 2005/0012421 A1 * | 1/2005 | Fukuda et al. | 310/179 |
| 2005/0035670 A1 * | 2/2005 | Chen et al. | 310/10 |
| 2005/0146809 A1 * | 7/2005 | Aoyagi et al. | 360/265.6 |
| 2005/0212366 A1 * | 9/2005 | Yoshiyama et al. | 310/68 B |
| 2005/0231053 A1 * | 10/2005 | Okamoto et al. | 310/90 |
| 2006/0082234 A1 * | 4/2006 | Tsukamoto | 310/90 |
| 2006/0117883 A1 * | 6/2006 | Yasuda et al. | 74/388 PS |
| 2006/0181168 A1 * | 8/2006 | Hargraves et al. | 310/90 |
| 2007/0205680 A1 * | 9/2007 | Miyoshi et al. | 310/90 |

FOREIGN PATENT DOCUMENTS

| | | |
|---|---|---|
| GB | 2 268 995 A | 1/1994 |
| JP | 6-253492 | 9/1994 |
| JP | 07-012122 A | 1/1995 |
| JP | 10-056753 A | 2/1998 |
| JP | 2001-103703 A | 4/2001 |
| JP | 2001-304254 A | 10/2001 |
| JP | 2002-199648 A | 7/2002 |
| JP | 2002-284023 | 10/2002 |
| JP | 2003-299294 A | 10/2003 |
| JP | 3123292 U | 6/2006 |
| WO | WO 2004051101 A1 * | 6/2004 |
| WO | WO 2005/124970 A1 | 12/2005 |
| WO | WO 2007/024681 A1 | 3/2007 |

* cited by examiner

ELECTRIC MOTOR AND ELECTRIC POWER STEERING APPARATUS

CROSS REFERENCE TO RELATED APPLICATIONS

This application claims the foreign priority benefit under Title 35, United States Code, §119(a)-(d) of Japanese Patent Application No. 2006-058859 filed on Mar. 6, 2006 in the Japan Patent Office, the disclosure of which is herein incorporated by reference in its entirety.

BACKGROUND OF THE INVENTION

The present invention relates to an electric motor such as a brushless DC motor, and an electric power steering apparatus employing this electric motor as a drive source.

As a power steering apparatus for easing steering effort of the driver, an electric power steering apparatus using power of an electric motor has been widely adopted for various vehicles in recent years in place of the conventional hydraulic power steering apparatus. In general, an electric power steering apparatus assists the steering operation of the driver by way of reducing the rotation speed of the electric motor and increasing the rotation torque instead by the reduction gear mechanism and then transmitting the rotation torque to the rack shaft through the rack and pinion mechanism.

The conventional electric power steering apparatus has a drawback that the rotation shaft (output shaft) of the electric motor as a drive source displaces in the axial direction. In order to prevent the axial displacement of the rotation shaft of the electric motor while rotatably supporting the same, for example, Japanese Laid-open Patent Application No. 2002-284023 (paragraph [0019]; FIG. 1) discloses a configuration, in which a bearing supports only one end of the rotation shaft of the electric motor such that the rotation shaft does not displace in the axial direction.

However, once the electric motor of the electric power steering apparatus is driven, due to unbalance of magnetic force or unbalance of the rotation shaft per se, a greater force (centrifugal force) is generated in the radial direction of the rotation shaft during the high speed rotation of the rotation shaft. For this reason, according to the configuration of Japanese Laid-open Patent Application No. 2002-284023, in which only one end of the rotation shaft of the electric motor is stationarily supported by the bearing so as not to displace in the axial direction, vibration is generated at the other end of the rotation shaft due to the greater force (centrifugal force) acting in the radial direction resulting from the rotation of the rotation shaft.

When vibration is generated on the rotation shaft during the actuation of the electric motor, the vibration is transmitted from the reduction gear mechanism joined to the rotation shaft through the steering shaft and to the steering wheel. Steering feeling upon maneuvering the steering wheel therefore deteriorates. Further, vibration generated on the rotation shaft is transmitted to the gear housing, by which the reduction gear mechanism and the like are accommodated and which is connected to the motor housing, and noise occurs from the gear housing.

In view of the above, the present invention seeks to provide an electric motor and an electric power steering apparatus employing this electric motor, which can reliably prevent a generation of vibration on the rotation shaft due to the radial force (centrifugal force) caused by the rotation of the rotation shaft.

SUMMARY OF THE INVENTION

According to one aspect of the present invention, there is provided an electric motor having a rotation shaft comprising:
a motor housing into which the electric motor is accommodated;
at least one pair of rolling bearings positioned in the motor housing and rotatably supporting both ends of the rotation shaft; and
a displacement restriction member provided inside the motor housing and restricting a displacement of the rolling bearing in an axial direction of the rolling bearing,
wherein each rolling bearing includes an inner race, an outer race, and rolling elements rotatably supported between the inner race and the outer race, and
wherein the inner race is press fitted without any gaps onto an outer peripheral surface of the rotation shaft, and the outer race is press fitted without any gaps into a bearing attachment portion provided inside the motor housing.

Further, there is provided an electric motor having a rotation shaft comprising:
a motor housing into which the electric motor is accommodated;
at least one pair of rolling bearings positioned in the motor housing and rotatably supporting both ends of the rotation shaft; and
a displacement restriction member provided inside the motor housing and restricting a displacement of the rolling bearing in an axial direction of the rolling bearing,
wherein each rolling bearing includes an inner race, an outer race, and rolling elements rotatably supported between the inner race and the outer race, and
wherein the inner race is press fitted without any gaps onto an outer peripheral surface of the rotation shaft, and the outer race is press fitted without any gaps into a bearing attachment portion provided inside the motor housing through a ring-shaped elastic member.

According to the aforementioned electric motors, in the rolling bearings for rotatably supporting both ends of the rotation shaft, the inner race of each rolling bearing is press fitted without any gaps onto the outer peripheral surface of the rotation shaft, and the outer race of each rolling bearing is press fitted without any gaps into the bearing attachment portion provided inside the motor housing (through elastic member). Therefore, even if a force is generated in the radial direction during the rotation of the rotation shaft, it is possible to prevent a generation of vibration on the rotation shaft.

Further, since the displacement restriction member for restricting a displacement of the rolling bearing in the axial direction of the rolling bearing is provided inside the motor housing, it is possible to prevent the rolling bearing from displacing in the axial direction.

For instance, the displacement restriction member may restrict a displacement of the outer race of the rolling bearing in the axial direction. In this instance, even if the interference for press fitting the rolling bearing into the housing is set to be smaller, it is possible to prevent an oscillating movement of the rolling bearing when a preload between the outer race and the inner race of the roller bearing makes the outer race slip and tilt in the axial direction so that the press fitting engagement between the inner race and the outer race partly strengthens or weakens.

In the conventional electric motor, it is necessary to provide a relatively large interference for press fitting the rolling bearing in order to prevent a slippage. This may increase friction at the bearing in some cases, which leads to a decrease in the service life of the bearing and an occurrence of torque ripple.

However, according to the present invention, the interference can be set smaller, which can overcome the aforementioned drawbacks.

In the aforementioned electric motor, the motor housing may have an opening in communication with the bearing attachment portion, and the displacement restriction member may be formed by a cap member attached to the opening.

With this configuration of the electric motor, the displacement restriction member is formed by a cap member attached to and closing the opening that is formed in the bearing attachment portion of the motor housing. Therefore, it is possible to readily attach the displacement restriction member to the bearing attachment portion.

In the aforementioned electric motor, the motor housing may have an opening in communication with the bearing attachment portion and including a threaded groove, and the displacement restriction member may be screwed into the threaded groove.

With this configuration of the electric motor, since the displacement restriction member is screwed into the thread provided in the opening of the bearing attachment portion, it is possible to readily and stably fix the displacement restriction member to the housing. Further, since the screwing amount of the displacement restriction member into the thread of the opening is adjusted, the position of the displacement restriction member can be readily adjusted.

Further, in the aforementioned electric motor, the motor housing may include an opening in communication with the bearing attachment portion, and a cap member attached to the opening, and the displacement restriction member may be formed by a tapered circlip fitted into an annular groove formed in the opening.

With this configuration of the electric motor, providing the tapered circlip can prevent the bearing from displacing in the axial direction.

In the aforementioned electric motor, the electric motor may be a brushless DC motor.

With this configuration of the electric motor, even if the electric motor is a brushless DC motor which can rotate at high speeds, it is possible to prevent a generation of vibration on the rotation shaft.

According to a second aspect of the present invention, the aforementioned electric motor applies power to a steering system as means of an electric power steering apparatus.

With this configuration, vibration of the rotation shaft can be prevented during the actuation of the electric motor. Therefore, excellent steering feeling can be obtained.

According to the present invention, even if a force is generated in the radial direction during the rotation of the rotation shaft, since there are no gaps between the inner race of each rolling bearing and the outer peripheral surface of the rotation shaft and between the outer race of each rolling bearing and the inner peripheral surface of the bearing attachment portion, it is possible to reliably prevent a generation of vibration on the rotation shaft. Further, since the electric motor is provided with the displacement restriction member, a displacement of the rolling bearing in the axial direction can be prevented. Therefore, it is possible to eliminate an oscillating movement of the rolling bearing due to a preload between the outer race and the inner race of the rolling bearing. As a result, the electric motor can prevent an increase in fluctuation of the friction torque (cogging torque) and an increase of vibration.

Further, according to the present invention, since a generation of vibration on the rotation shaft can be prevented during the actuation of the electric motor, excellent steering feeling can be obtained. Also, since the rotation shaft is free of vibration, it is possible to prevent an occurrence of abnormal noise at the gear housing, by which the reduction gear mechanism and the like are accommodated and which is connected to the motor housing.

Other features and advantages of the present invention will be apparent from the following description taken in conjunction with the accompanying drawings.

BRIEF DESCRIPTION OF THE DRAWINGS

The aspects of the present invention will become more apparent by describing in detail illustrative, non-limiting embodiments thereof with reference to the accompanying drawings, in which.

DESCRIPTION OF THE PREFERRED EMBODIMENTS

The present invention will be described below with reference to a plurality of embodiments with reference to the accompanying drawings.

First Embodiment

Figure 1:
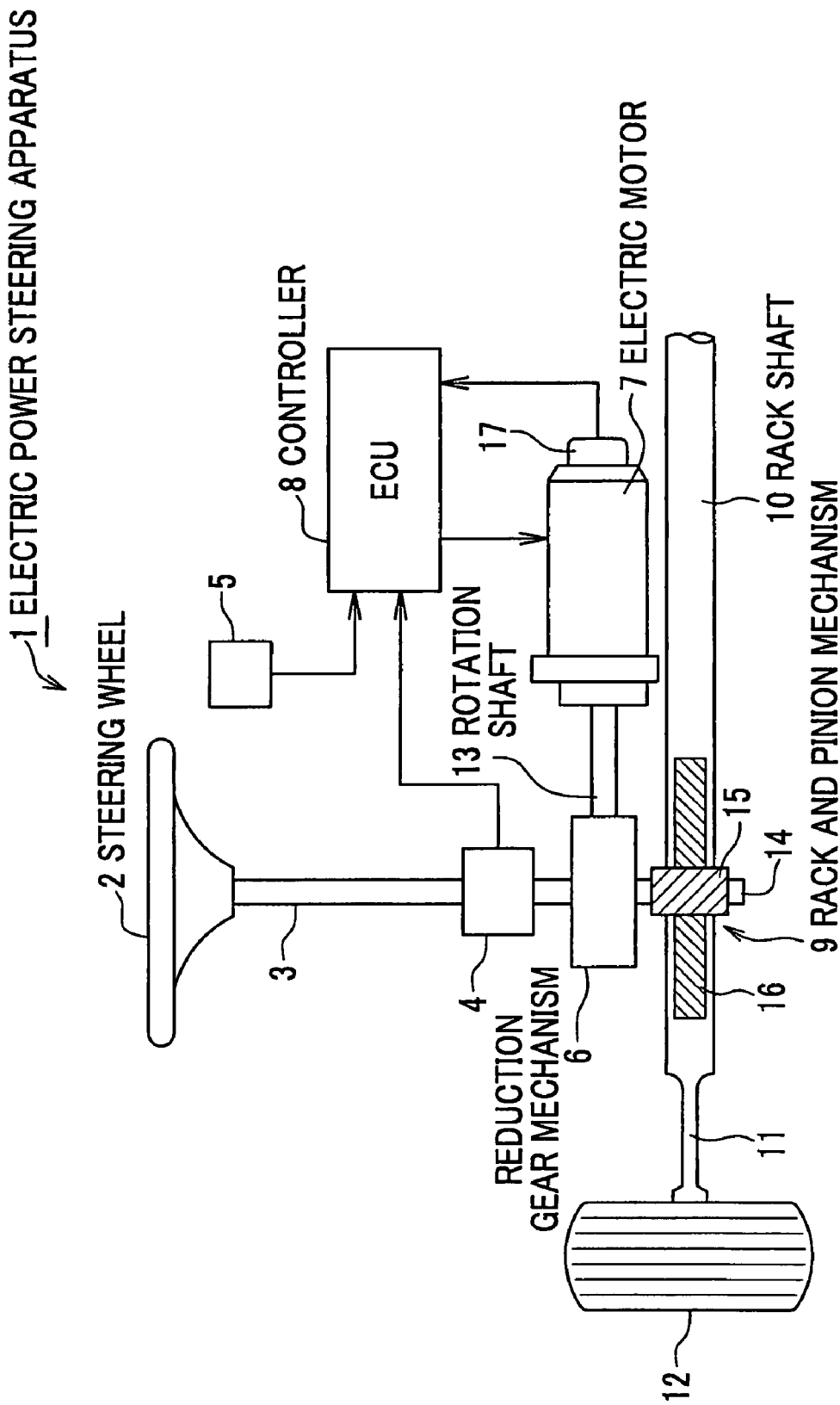
FIG. 1 is a block diagram schematically illustrating an electric power steering apparatus equipped with an electric motor according to a first embodiment of the present invention.

As seen in FIG. 1, an electric power steering apparatus 1 according to this preferred embodiment includes a steering shaft 3 connected with a steering wheel 2, a steering torque sensor 4 for detecting a steering torque applied to the steering shaft 3, a vehicle speed sensor 5 for detecting vehicle speed, an electric motor 7 which generates an assist steering force and imparts the same to the steering shaft 3 through a reduction gear mechanism 6, a controller (ECU) 8 which controls the drive of the electric motor 7, and a rack shaft 10 coupled with the steering shaft 3 through a rack and pinion mechanism 9. Although only one side is shown in the figure, front wheels (steerable wheels) 12, 12 are joined at both ends of the rack shaft 10 through tie rods 11, etc.

Figure 2:
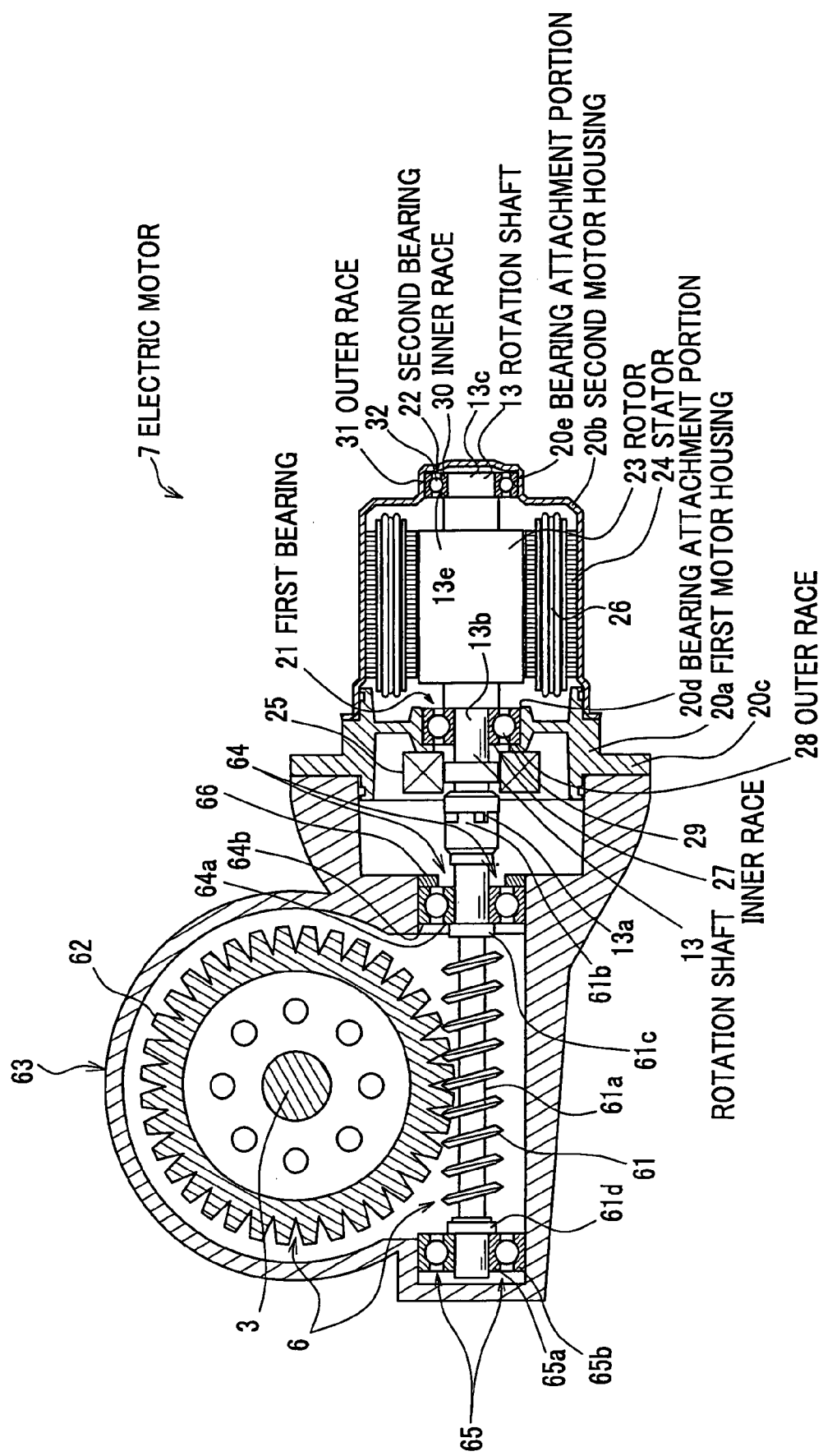
FIG. 2 is an enlarged schematic sectional view illustrating the electric motor and the reduction gear mechanism as shown in FIG. 1.

As seen in FIG. 2, the reduction gear mechanism 6 consists of a speed reduction gear and increases and transmits the rotation torque of the electric motor 7 to the steering shaft 3. The reduction gear mechanism 6 includes, for instance, a worm gear 61 which is provided on and rotates with the rotation shaft (output shaft) 13 of the electric motor 7, and a worm wheel 62 which is provided on the steering shaft 3 and brought into meshing engagement with the worm gear 61.

As seen in FIG. 2, the worm gear 61 and the worm wheel 62 are accommodated in a gear housing 63 which is fixed to a flange portion 20c of a first motor housing 20a.

The worm gear 61 is integral with a worm shaft 61a which extends coaxially with the rotation shaft 13. The worm shaft 61a has a coupling portion 61b at one end thereof so that the coupling portion 61b couples with a corresponding coupling portion 13a of the rotation shaft 13, thereby rotating together with the rotation shaft 13.

The worm shaft 61a is retained in the gear housing 63 in such a manner that one end of the worm shaft 61a that is closer to the electric motor 7 is rotatably supported by a third bearing 64 consisting of a rolling bearing such as a ball bearing, whereas the other end of the worm shaft 61a is rotatably supported by a fourth bearing 65 consisting of a rolling bearing such as a ball bearing.

The third bearing 64 and the fourth bearing 65 are positioned such that inner races 64a, 65a are adjacent to stoppers 61c, 61d, respectively, which are integral with the worm shaft 61a, and outer races 64b, 65b are attached to the inner wall of the gear housing 63.

A displacement restriction member 66 such as a snap ring is fitted into the inner wall of the gear housing 63. The displacement restriction member 66 prevents displacement of the outer race 64b of the third bearing 64 in the axial direction toward the electric motor 7.

As seen in FIG. 1, the electric motor 7 is a brushless DC motor in this preferred embodiment. The electric motor 7 is connected to the gear housing 63 (see FIG. 2) accommodating the reduction gear mechanism 6, the rack and pinion mechanism 9, etc. Details of the electric motor 7 as characteristic features of the present invention will be described later. The rack and pinion mechanism 9 includes a pinion 15 provided on a pinion shaft 14 that is joined to the steering shaft 3, and a rack 16 provided on the rack shaft 10.

The electric power steering apparatus 1 according to this preferred embodiment is constructed as above. When the driver turns the steering wheel 2, steering torque applied to the steering shaft 3 is transmitted to the rack shaft 10 through the rack and pinion mechanism 9 where the rotational movement of the steering shaft 3 is converted into the reciprocating movement of the rack shaft 10. This reciprocating movement is further transmitted to the wheels 12, 12 through tie rods 11, 11, etc, to thereby turn the wheels 12, 12.

While the driver turns the steering wheel 2, the controller (ECU) 8 sets a target current value for an electric current flowing through the electric motor 7 based on a steering torque signal output from the steering torque sensor 4 and a vehicle speed signal output from the vehicle speed sensor 5, and then drives the electric motor 7 with a current feedback control, in which a deviation between the target current value and the motor current value output from a motor current sensor 17 is adjusted to be zero. Therefore, the electric motor 7 generates an appropriate assist steering force (assisting force). Since this assist steering force is applied to the steering shaft 3 through the reduction gear mechanism 6, the steering force required for the driver to turn the steering wheel 2 can be decreased.

Configuration of Electric Motor

Figure 3:
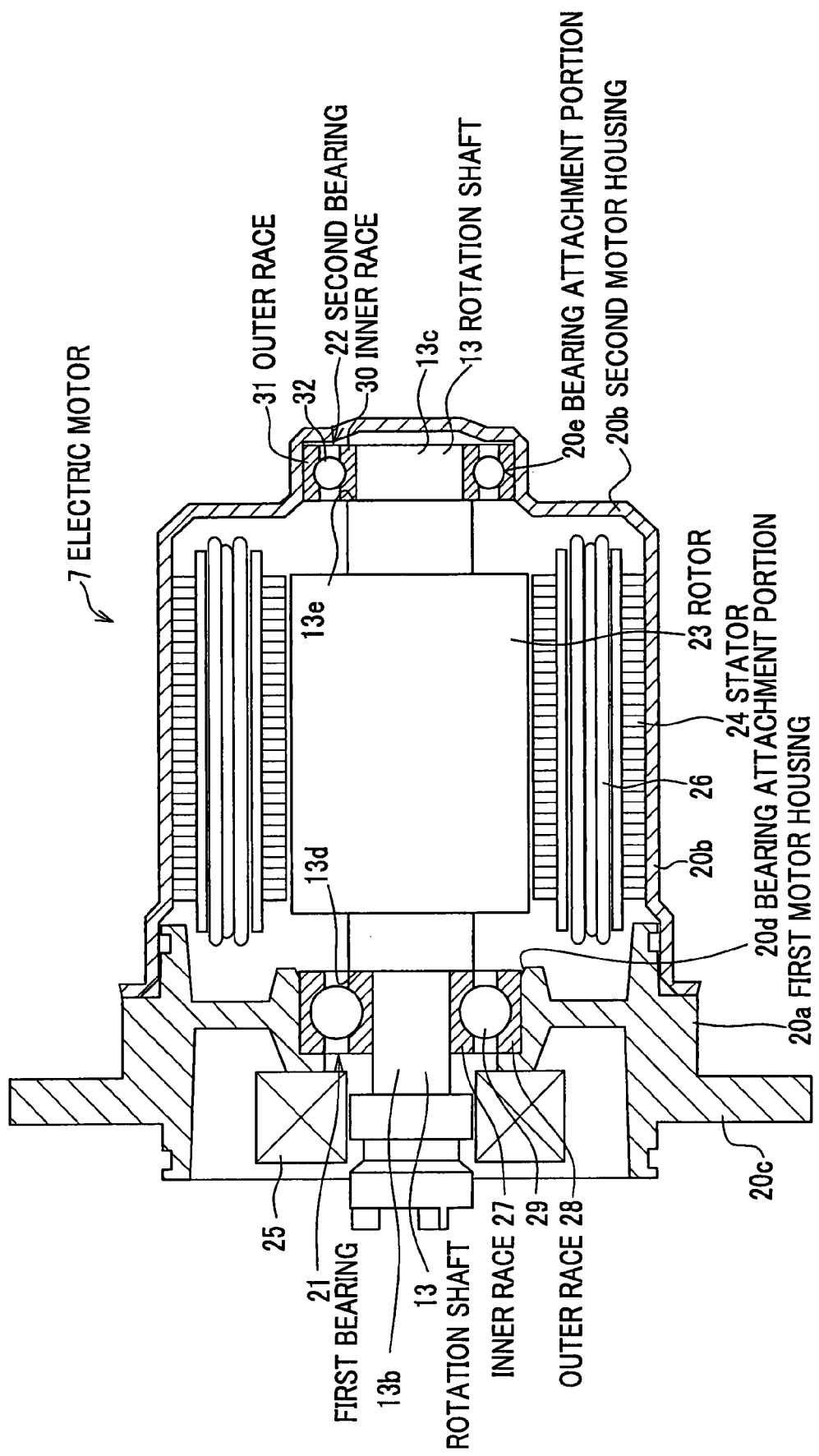
FIG. 3 is an enlarged schematic sectional view illustrating the electric motor according to the first embodiment.

As seen in FIG. 3, the electric motor 7 has first and second motor housings 20a, 20b which are integrally connected to each other. The electric motor 7 is a brushless DC motor including the rotation shaft 13 whose ends are rotatably supported by a pair of first and second bearings 21, 22 each consisting of a rolling bearing such as a radial ball bearing, a rotor 23 fixed to the outer peripheral surface of the rotation shaft 13, a plurality of stators 24 fixed to the inner peripheral surface of the second motor housing 20b in such positions to be opposite to the outer peripheral surface of the rotor 23, and a resolver 25 for detecting the rotation angle of the rotor 23. The controller (ECU) 8 (see FIG. 1) controls to flow an electric current to a coil 26 of each stator 24 in a predetermined order based on a rotation angle detection signal indicating the rotation angle of the rotor 23 output from the resolver 25, so that a rotating magnetic field is generated and the rotor 23 is rotated by this rotating magnetic field. When the rotor 23 rotates, the rotation shaft 13 also rotates together with the rotor 23.

The first motor housing 20a is inserted into and at the flange portion 20c fixed to an opening of the gear housing 63 (FIG. 2) which accommodates the reduction gear mechanism 6, the rack and pinion mechanism 9, etc.

The first bearing 21 consists of a ring-shaped inner race 27 which is press fitted without any gaps onto the outer peripheral surface of the rotation shaft 13, an outer race 28 which is press fitted without any gaps into the inner peripheral surface of a bearing attachment portion 20d formed in the first motor housing 20a, and rolling elements 29, 29 rotatably supported between the inner race 27 and the outer race 28.

Similarly, the second bearing 22 consists of a ring-shaped inner race 30 which is press fitted without any gaps onto the outer peripheral surface of the rotation shaft 13, an outer race 31 which is press fitted without any gaps into the inner peripheral surface of a bearing attachment portion 20e formed in the second motor housing 20b, and rolling elements 32 rotatably supported between the inner race 30 and the outer race 31.

As seen in FIG. 3, the outer race 28 of the first bearing 21 is fitted into the bearing attachment portion 20d in the form of an annular stepped member and thereby fixed to the first motor housing 20a. The outer race 31 of the second bearing 22 is fitted into the bearing attachment portion 20e in the form of an annular recess member and thereby fixed to the second motor housing 20b.

The inner races 27, 30 of the first and second bearings 21, 22 are respectively fitted onto smaller-diameter portions 13b, 13c of the rotation shaft 13, and they are assembled such that their ends facing toward the rotor 23 abut on corresponding stepped surfaces 13d, 13e.

Therefore, the first bearing 21 is assembled while being interposed between the bearing attachment portion 20d of the first motor housing 20a and the stepped surface 13d of the rotation shaft 13. Meanwhile, the second bearing 22 is assembled while being interposed between the bearing attachment portion 20e of the second motor housing 20b and the stepped surface 13e of the rotation shaft 13.

As described above, the inner bearings 27, 30 of the first and second bearings 21, 22 which rotatably support the rotation shaft 13 of the electric motor 7 are press fitted without any gaps onto the outer peripheral surface of the rotation shaft 13, whereas the outer bearings 28, 31 are respectively press fitted without any gaps into the inner peripheral surfaces of the bearing attachment portions 20d, 20e. Therefore, even if a force (centrifugal force) is generated in the radial direction during the rotation of the rotation shaft 13, since there are no gaps between the inner races 27, 30 of the first and second bearings 21, 22 and the outer peripheral surface of the rotation shaft 13 and between the outer races 28, 31 and the inner peripheral surfaces of the bearing attachment portions 20d, 20e, it is possible to prevent vibration of the rotation shaft 13. Particularly, even if the electric motor 7 is a brushless DC motor according to this preferred embodiment, vibration of the rotation shaft 13 can be prevented during the high-speed rotation of the rotation shaft 13.

Further, since the electric power steering apparatus 1 according to this preferred embodiment is equipped with the electric motor 7 as describe above, vibration of the rotation shaft 13 can be prevented during the actuation of the electric motor 7. Therefore, excellent steering feeling can be obtained, while preventing an occurrence of noise from the gear housing 63 (FIG. 2) accommodating the reduction gear mechanism 6, the rack and pinion mechanism 9, etc.

Second Embodiment

An electric motor of an electric power steering apparatus according to the second embodiment of the present invention will be described below. Like parts with the same functions as those previously described with reference to the electric motor of the electric power steering apparatus according to the first embodiment as shown in FIG. 3 are denoted by the same reference numerals, and detailed description thereof will be omitted.

Figure 4:
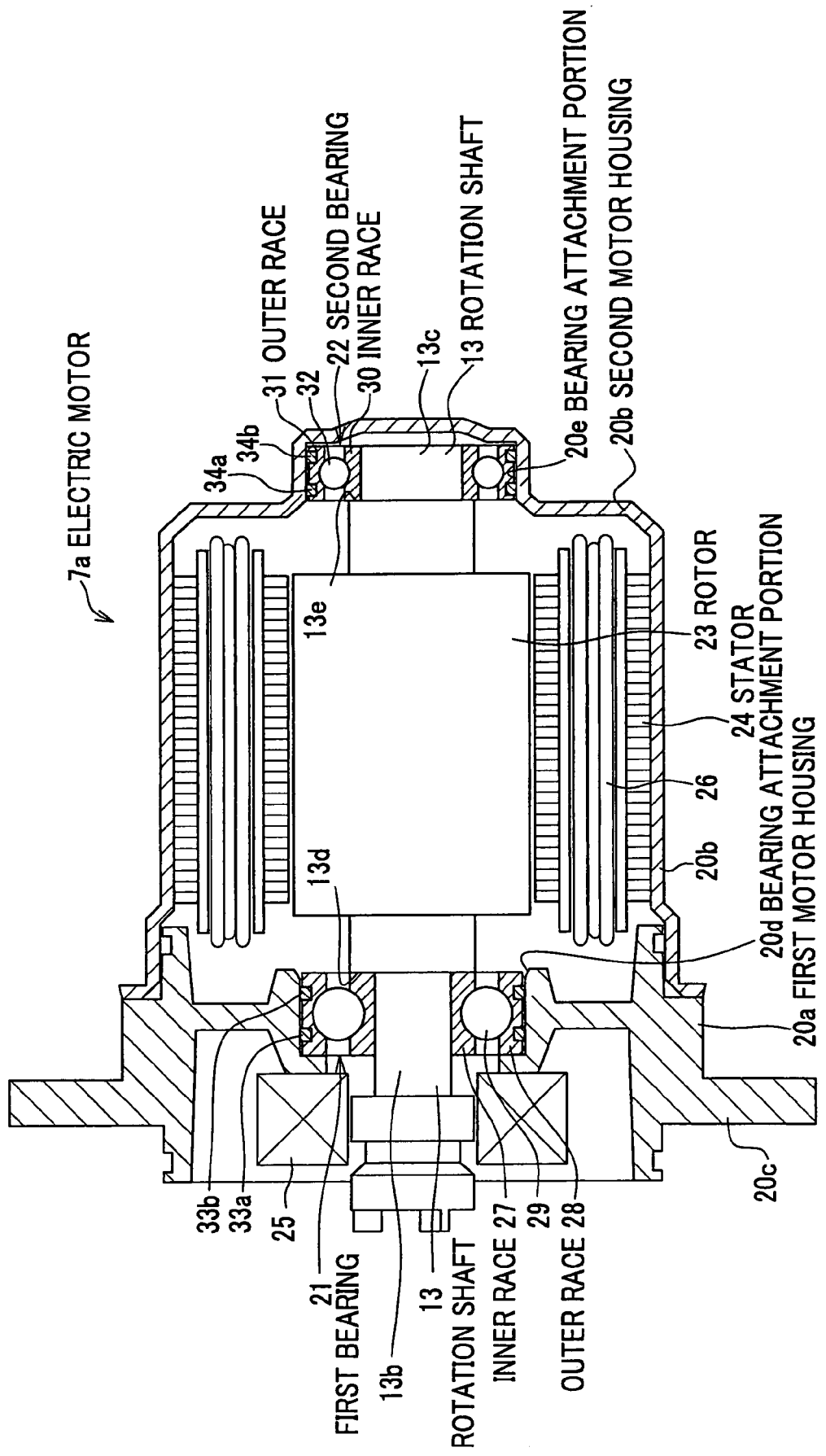
FIG. 4 is an enlarged schematic sectional view illustrating an electric motor according to a second embodiment.

As shown in FIG. 4, an electric motor 7a according to this preferred embodiment is configured such that the outer races 28, 31 of the first and second bearings 21, 22 are respectively press fitted into the inner peripheral surfaces of the corresponding bearing attachment portions 20d, 20e through a plurality (two in the figure) of ring-shaped elastic members 33a, 33b, 34a, 34b.

In the outer peripheral surfaces of the outer races 28, 31 are formed grooves for the press fitting engagement of the ring-shaped elastic members 33a, 33b, 34a, 34b. Each of the ring-shaped elastic members 33a, 33b, 34a, and 34b has a square-shaped cross section.

Other configurations of the electric power steering apparatus are the same as those previously described in the electric power steering apparatus according to the first embodiment as shown in FIG. 1.

As described above, according to the second embodiment of the present invention, the inner bearings 27, 30 of the first and second bearings 21, 22 which rotatably support the rotation shaft 13 of the electric motor 7a are press fitted without any gaps onto the outer peripheral surface of the rotation shaft 13, whereas the outer bearings 28, 31 are respectively press fitted without any gaps into the inner peripheral surfaces of the bearing attachment portions 20d, 20e through the ring-shaped elastic members 33a, 33b, 34a, 34b. Therefore, even if a force (centrifugal force) is generated in the radial direction during the rotation of the rotation shaft 13, since there are no gaps between the inner races 27, 30 of the first and second bearings 21, 22 and the outer peripheral surface of the rotation shaft 13 and between the outer races 28, 31 and the inner peripheral surfaces of the bearing attachment portions 20d, 20e, it is possible to prevent vibration of the rotation shaft 13.

Further, even if temperatures of the first and second bearings 21, 22 increase due to the rotation of the rotation shaft 13, since the thermal expansion coefficient is different because of the difference of the materials between the outer races 28, 31 of the first and second bearings 21, 22 and the first and second motor housings 20a, 20b, the ring-shaped elastic members 33a, 33b, 34a, 34b elastically deform and absorb, for instance, expansion of the bearing attachment portions 20d, 20e of the first and second motor housings 20a, 20b. Therefore, no gaps are created between the outer races 28, 31 and the inner peripheral surfaces of the bearing attachment portions 20d, 20e, and a generation of vibration on the rotation shaft 13 can be prevented.

Third Embodiment

An electric motor of an electric power steering apparatus according to the third embodiment of the present invention will be described below. Like parts with the same functions as those previously described with reference to the electric motor of the electric power steering apparatus according to the second embodiment as shown in FIG. 4 are denoted by the same reference numerals, and detailed description thereof will be omitted.

Figure 5:
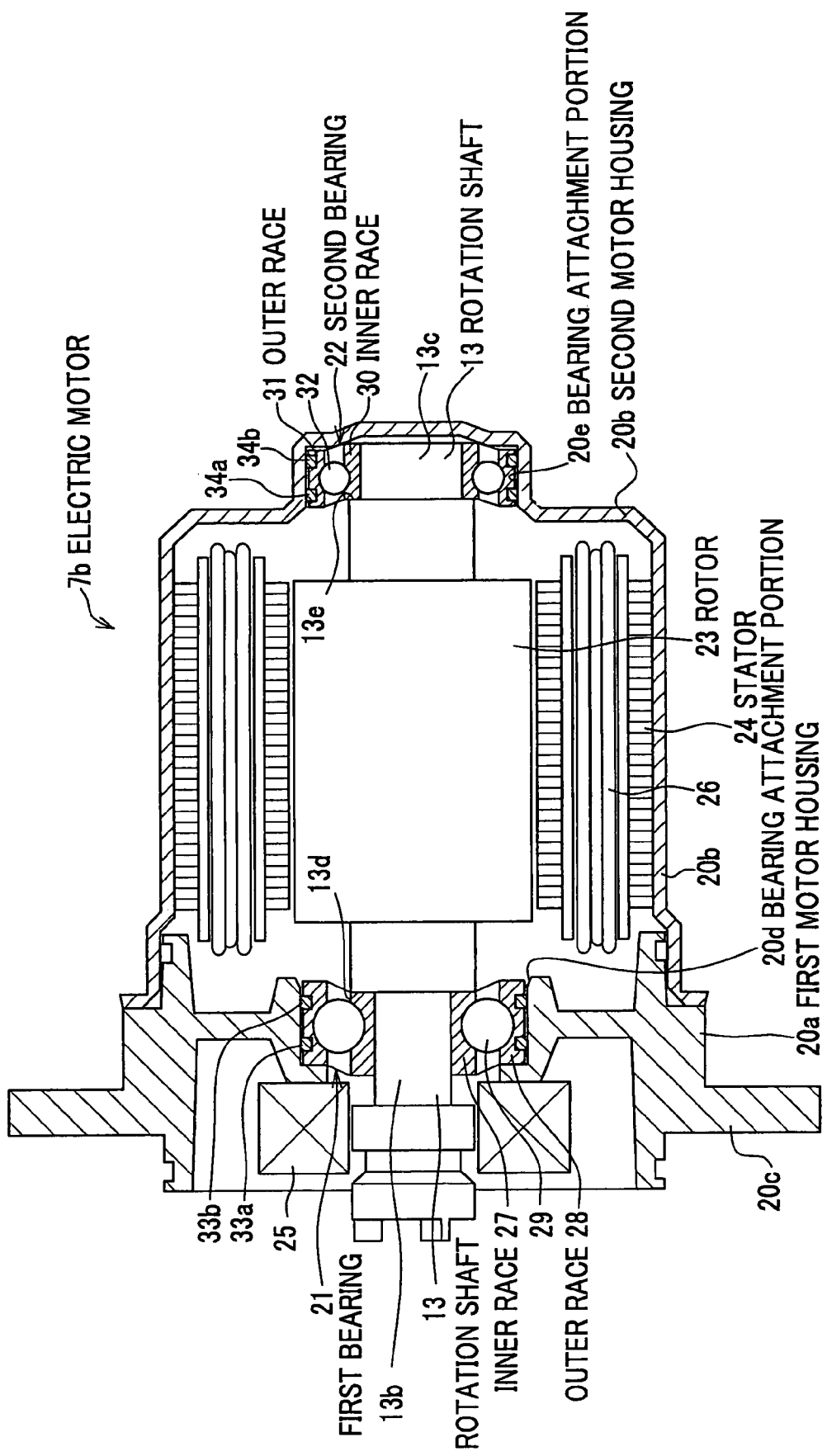
FIG. 5 is an enlarged schematic sectional view illustrating an electric motor according to a third embodiment.

As seen in FIG. 5, an electric motor 7b according to this preferred embodiment is configured such that when compared with the second embodiment, the inner race 27 and the outer race 28 of the first bearing 21 are offset in the axial direction of the rotation shaft 13 with respect to the raceway surfaces of the rolling elements 29, 29, and the inner race 30 and the outer race 31 of the second bearing 22 are offset in the axial direction of the rotation shaft 13 with respect to the raceway surfaces of the rolling elements 32, 32, so that the inner races 27, 30 of the first and second bearings 21, 22 are positioned slightly outward along the axial direction of the rotation shaft 13 with respect to the corresponding outer races 28, 31. With this arrangement of the first and second bearings 21, 22, part of a force (centrifugal force) generated in the radial direction during the rotation of the rotation shaft 13 acts in the diagonally outward direction from the inward of each inner race 27, 30 through the rolling elements 29, 32 and toward the outer side of each outer race 28, 31.

Therefore, even if a force (centrifugal force) is generated in the radial direction during the rotation of the rotation shaft 13, since part of the force acts toward outer sides of the outer races 28, 31 away from the rotor 24, it is possible to decrease force acting on the inner peripheral surfaces of the bearing attachment portions 20d, 20e during the high-speed rotation of the rotation shaft 13. This makes it possible to reliably prevent vibration of the rotation shaft 13.

Fourth Embodiment

An electric motor of an electric power steering apparatus according to the fourth embodiment of the present invention will be described below. Like parts with the same functions as those previously described with reference to the electric motor of the electric power steering apparatus according to the second embodiment as shown in FIG. 4 are denoted by the same reference numerals, and detailed description thereof will be omitted.

Figure 6:
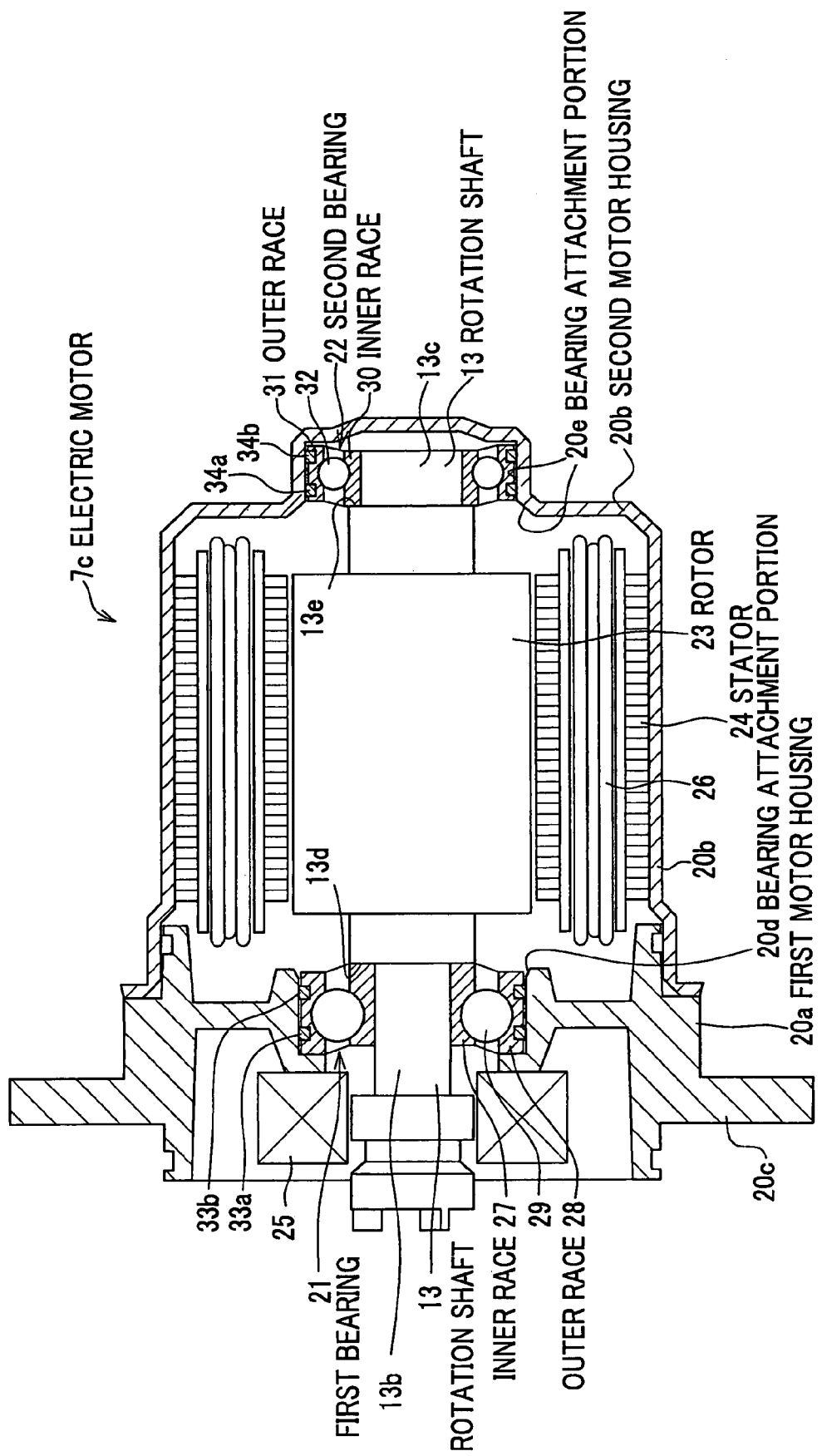
FIG. 6 is an enlarged schematic sectional view illustrating an electric motor according to a fourth embodiment.

As seen in FIG. 6, an electric motor 7c according to this preferred embodiment is configured such that when compared with the second embodiment as shown in FIG. 4, the inner race 27 and the outer race 28 of the first bearing 21 are offset in the axial direction of the rotation shaft 13 with respect to the raceway surfaces of the rolling elements 29, 29, and the inner race 30 and the outer race 31 of the second bearing 22 are offset in the axial direction of the rotation shaft 13 with respect to the raceway surfaces of the rolling elements 32, 32, so that the outer races 28, 31 of the first and second bearings 21, 22 are positioned slightly outward along the axial direction of the rotation shaft 13 with respect to the corresponding inner races 27, 30. With this arrangement of the first and second bearings 21, 22, part of a force (centrifugal force) generated in the radial direction during the rotation of the rotation shaft 13 acts in the diagonally inward direction from the outer side of each inner race 27, 30 through the rolling elements 29, 32 and toward the inward of each outer race 28, 31.

Therefore, even if a force (centrifugal force) is generated in the radial direction during the rotation of the rotation shaft 13, since part of the force acts toward the inner sides of the outer races 28, 31 close to the rotor 24, it is possible to decrease force acting on the inner peripheral surfaces of the bearing attachment portions 20*d*, 20*e* during the high-speed rotation of the rotation shaft 13. This makes it possible to reliably prevent vibration of the rotation shaft 13.

In the electric power steering apparatus 1 employing one of the electric motors 7*a*-7*c* according to the second to fourth embodiments as shown in FIGS. 4 through 6, vibration of the rotation shaft 13 can be prevented during the actuation of the electric motor 7*a*-7*c* as with the first embodiment. Therefore, excellent steering feeling can be obtained, while preventing an occurrence of noise from the gear housing 63 (FIG. 2) accommodating the reduction gear mechanism 6, the rack and pinion mechanism 9, etc.

Fifth Embodiment

An electric motor of an electric power steering apparatus according to the fifth embodiment of the present invention will be described below. Like parts with the same functions as those previously described with reference to the electric motor of the electric power steering apparatus according to the first embodiment as shown in FIG. 3 are denoted by the same reference numerals, and detailed description thereof will be omitted.

Figure 7:
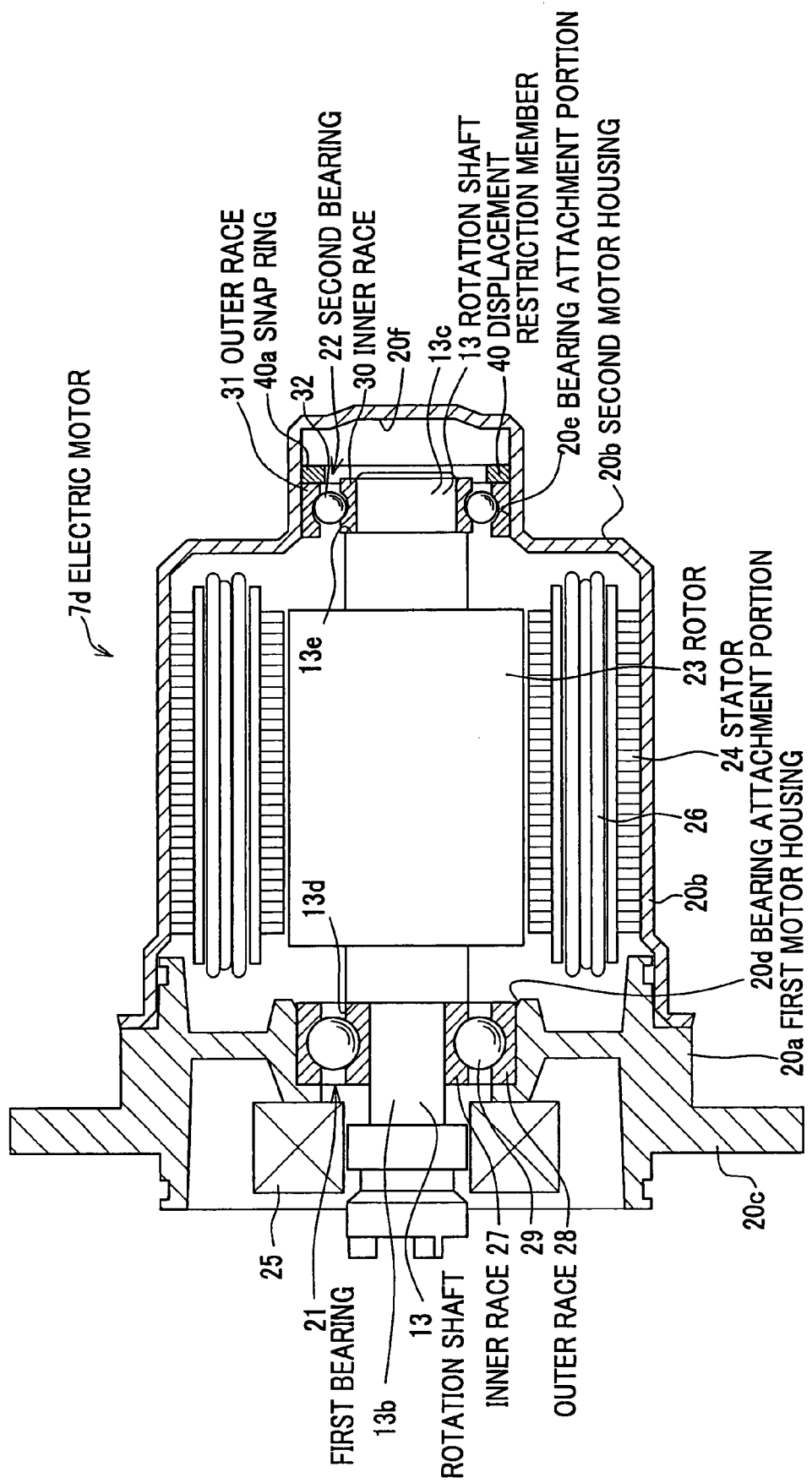
FIG. 7 is an enlarged schematic sectional view illustrating an electric motor according to a fifth embodiment.

As seen in FIG. 7, an electric motor 7*d* according to this preferred embodiment is configured such that when compared with the first embodiment as shown in FIG. 3, a displacement restriction member 40, which restricts a displacement of the outer race 31 of the rolling bearing arranged as the second bearing 22 in the axial direction, is provided in the second motor housing 20*b* at the bearing attachment portion 20*e*.

Figure 8:
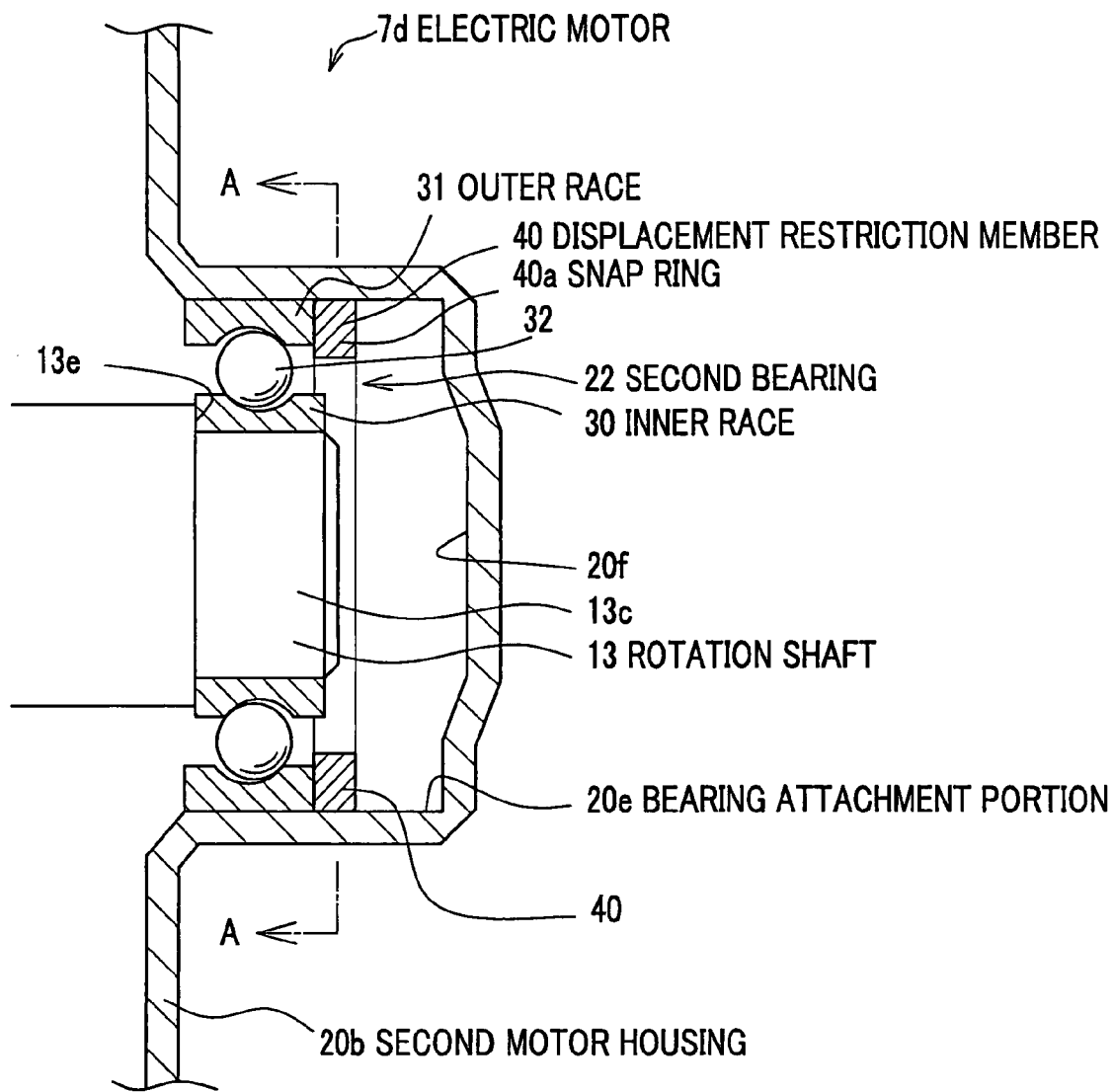
FIG. 8 is an enlarged view of a second bearing as shown in FIG. 7.

As shown in FIG. 8, the displacement restriction member 40 prevents the outer race 31 from displacing toward a back wall 20*f* of a bearing attachment portion 20*e* in the form of a circular recess (toward the longitudinal direction of the rotation shaft 13). For example, the displacement restriction member 40 consists of a snap ring.

Figure 9:
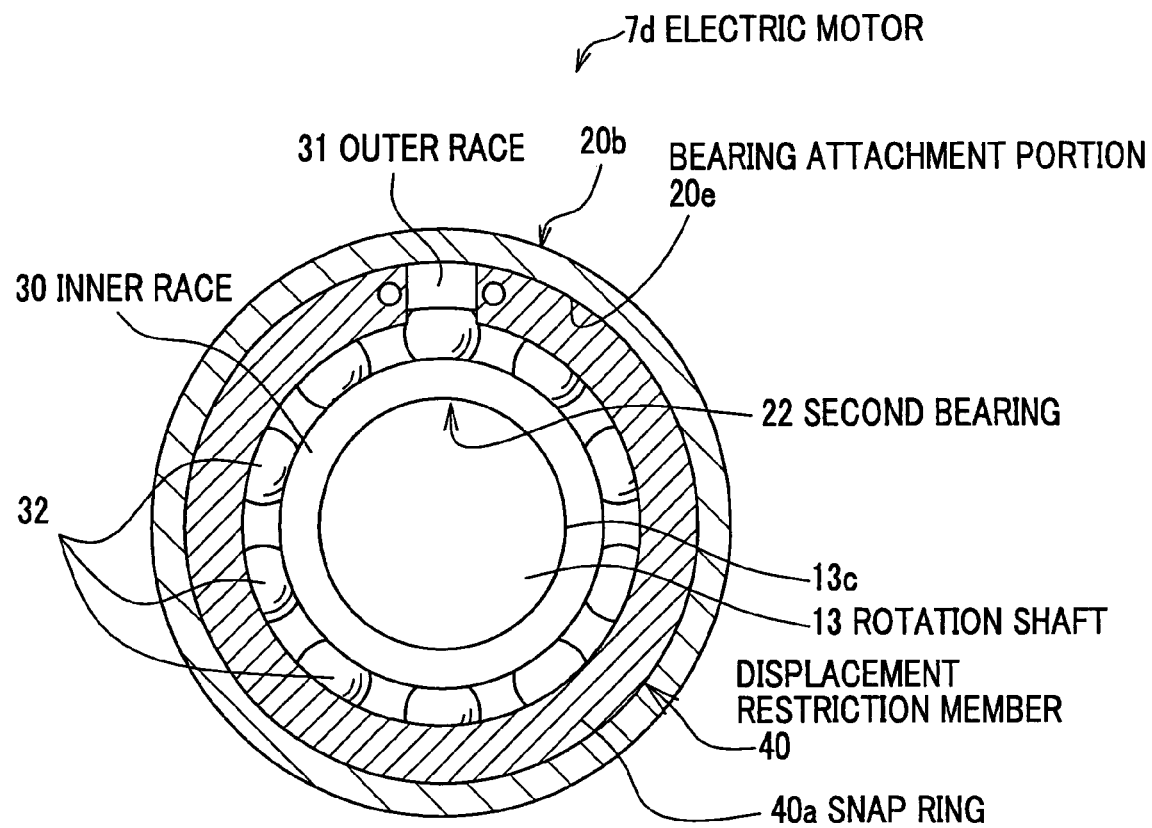
FIG. 9 is a sectional view taken along the line A-A of FIG. 8.

As shown in FIG. 9, the snap ring 40*a* is a C-shaped locating snap ring made of a metal plate spring. The snap ring 40*a* is fixed to the inner wall of the bearing attachment portion 20*e* by the resilient force of the spring.

Therefore, when a thrust load is applied and the second bearing 22 is liable to displace in the axial direction during the rotation of the rotation shaft 13, the snap ring 40*a* restricts a displacement of the outer race 31 in the axial direction toward the back wall 20*f*. Even if the interference for press fitting the second bearing 22 into the second motor housing 20*b* is set to be smaller, it is possible to prevent an oscillating movement of the second bearing 22 when a preload between the outer race 31 and the inner race 30 makes the outer race 31 slip and tilt against the inner race 30 so that the press fitting engagement between the inner race 30 and the outer race 31 partly strengthens or weakens.

Sixth Embodiment

An electric motor of an electric power steering apparatus according to the sixth embodiment of the present invention will be described below. Like parts with the same functions as those previously described with reference to the electric motor of the electric power steering apparatus according to the first embodiment as shown in FIG. 3 and the electric motor of the electric power steering apparatus according to the fifth embodiment as shown in FIG. 7 are denoted by the same reference numerals, and detailed description thereof will be omitted.

Figure 10:
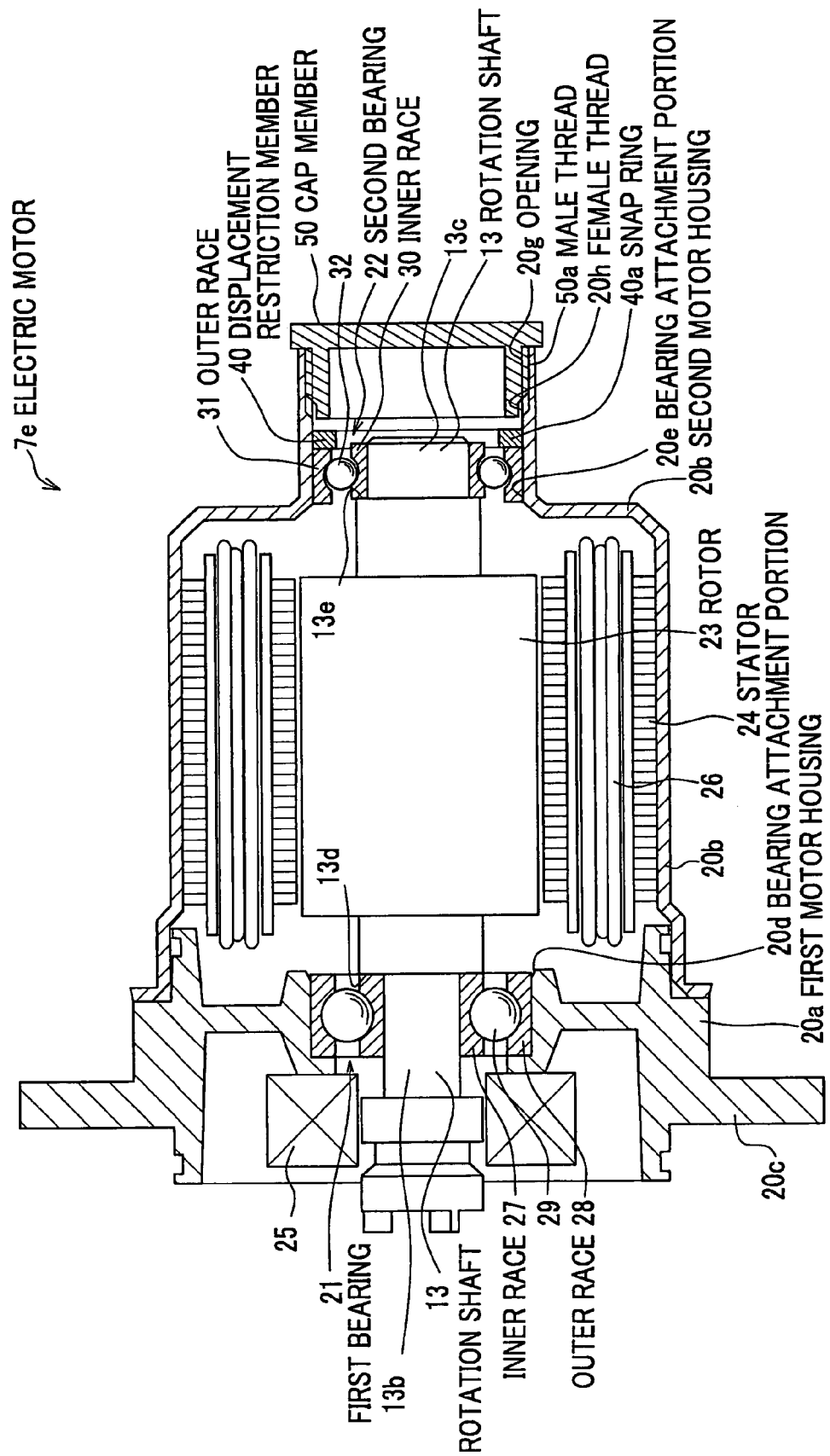
FIG. 10 is an enlarged schematic sectional view illustrating an electric motor according to a sixth embodiment.

As seen in FIG. 10, an electric motor 7*e* according to this preferred embodiment is configured such that when compared with the fifth embodiment as shown in FIG. 7, the bearing attachment portion 20*e* is formed in the shape of a cylinder having a female thread (threaded portion) 20*h* in the inner wall thereof and an opening 20*g* of the bearing attachment portion 20*e* is closed by a cap member 50.

The cap member 50 has a male thread (threaded portion) 50*a* which allows a screwing engagement with the female thread 20*h*. The cap member 50 is detachably mounted to the female thread 20*h* of the opening 20*g*. The cap member 50 is made of a material such as metal and synthetic resin.

As long as it closes the opening 20*g* of the bearing attachment portion 20*e*, the cap member 50 may be attached to the opening 20*g* in any known methods such as press fitting.

As described above, providing the opening 20*g* and the cap member 50 allows the second bearing 22 and the displacement restriction member 40 to be inserted through the opening 20*g*. Therefore, it is possible to readily install the second bearing 22 and the displacement restriction member 40. Further, the annular groove (not shown) for press fitting the snap ring 40*a* can be readily formed in the inner wall of the bearing attachment portion 20*e*, and so the snap ring 40*a* can be stably fixed to the bearing attachment portion 20*e* by press fitting the snap ring 40*a* into the corresponding annular groove.

Seventh Embodiment

An electric motor of an electric power steering apparatus according to the seventh embodiment of the present invention will be described below. Like parts with the same functions as those previously described with reference to the electric motor of the electric power steering apparatus according to the first embodiment as shown in FIG. 3 and the electric motor of the electric power steering apparatus according to the sixth embodiment as shown in FIG. 10 are denoted by the same reference numerals, and detailed description thereof will be omitted.

Figure 11:
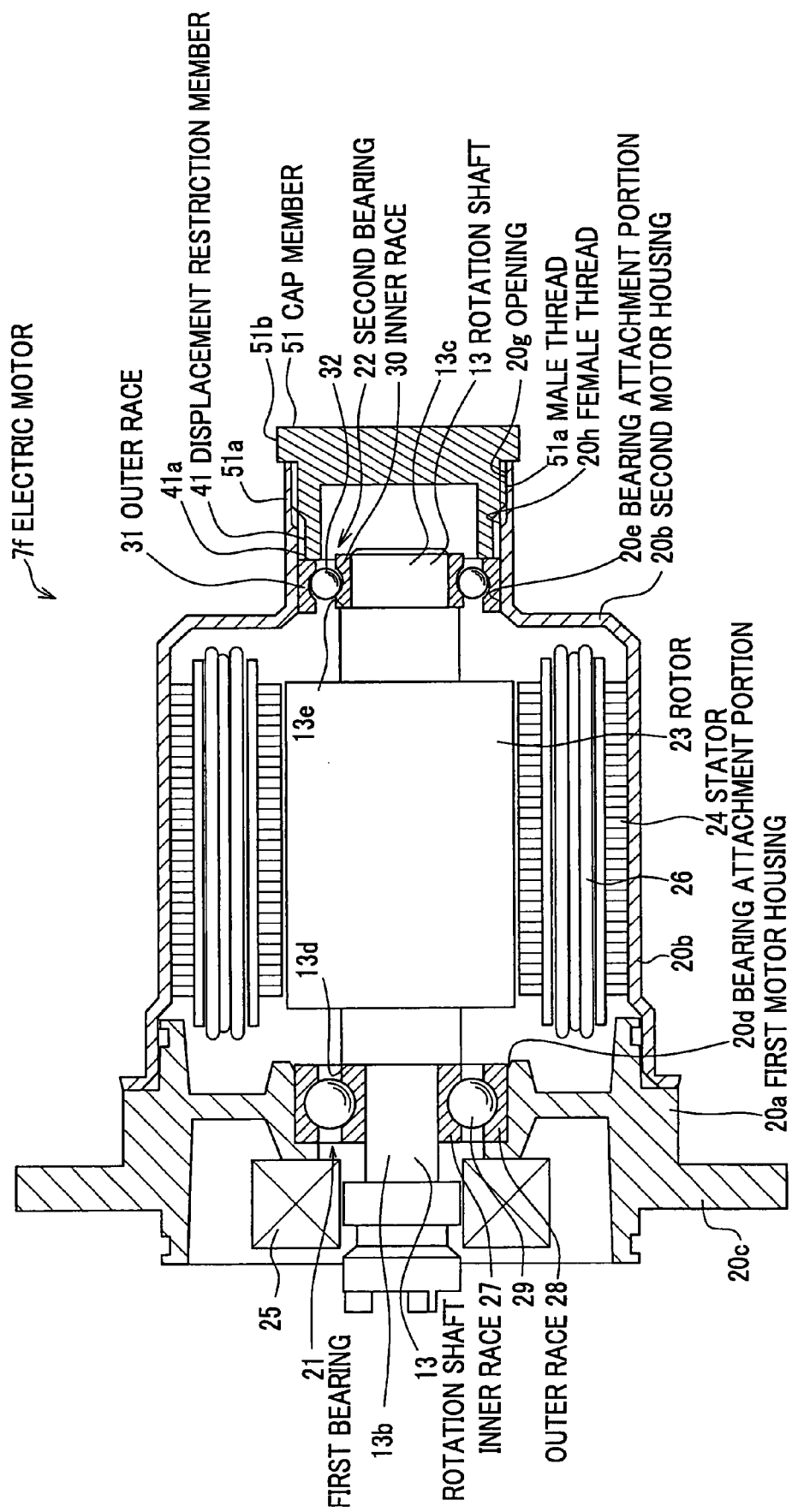
FIG. 11 is an enlarged schematic sectional view illustrating an electric motor according to a seventh embodiment.

As seen in FIG. 11, an electric motor 7*f* according to this preferred embodiment is configured such that when compared with the snap ring 40*a* (displacement restriction member 40) of the electric motor 7*e* according to the sixth embodiment as shown in FIG. 10, a cap member 51 is provided with a displacement restriction member 41 for restricting a displacement of the outer race 31 of the second bearing 22 in the axial direction.

The cap member 51 is made of a material such as metal and synthetic resin, and is integrally formed with a male thread (threaded portion) 51*a* which allows a screwing engagement with the female thread (threaded portion) 20*h*, a displacement restriction member 41 having a pressing portion 41*a* at its distal end which abuts on the outer race 31, and a head portion 51*b*.

The cap member 51 may form the male thread 51*a* on the displacement restriction member 41, and the head portion 51*b* may be a lock nut having a female thread 20*h* and preventing looseness of the nut.

Further, the cap member 51 may be a cap nut which is integrally formed with the pressing portion 41*a* for pressing the outer race 31, and which is fixed to the cylinder-shaped bearing attachment portion 20*e*.

As described above, since the displacement restriction member 41 is inserted through the opening 20*g* and is mounted thereto, it is possible to readily install the second bearing 22 and the displacement restriction member 40 and to prevent a displacement of the outer race 31 toward the inlet end of the opening 20*g* by means of the pressing portion 41*a* of the displacement restriction member 41.

Further, the male thread 51a of the displacement restriction member 41 (cap member 51) is screwed into the female thread 20h of the opening 20g, and so the screwing amount of the displacement restriction member 41 upon fixing to the female thread 20h can be adjusted, which can displace and adjust the position of the pressing portion 41a. The displacement restriction member 41 allows the outer race 31 of the second bearing 22 to be arranged in an appropriate position by adjusting the pressing position where the pressing portion 41a presses the outer race 31.

Eighth Embodiment

An electric motor of an electric power steering apparatus according to the eighth embodiment of the present invention will be described below. Like parts with the same functions as those previously described with reference to the electric motor of the electric power steering apparatus according to the first embodiment as shown in FIG. 3 and the electric motor of the electric power steering apparatus according to the seventh embodiment as shown in FIG. 11 are denoted by the same reference numerals, and detailed description thereof will be omitted.

Figure 12:
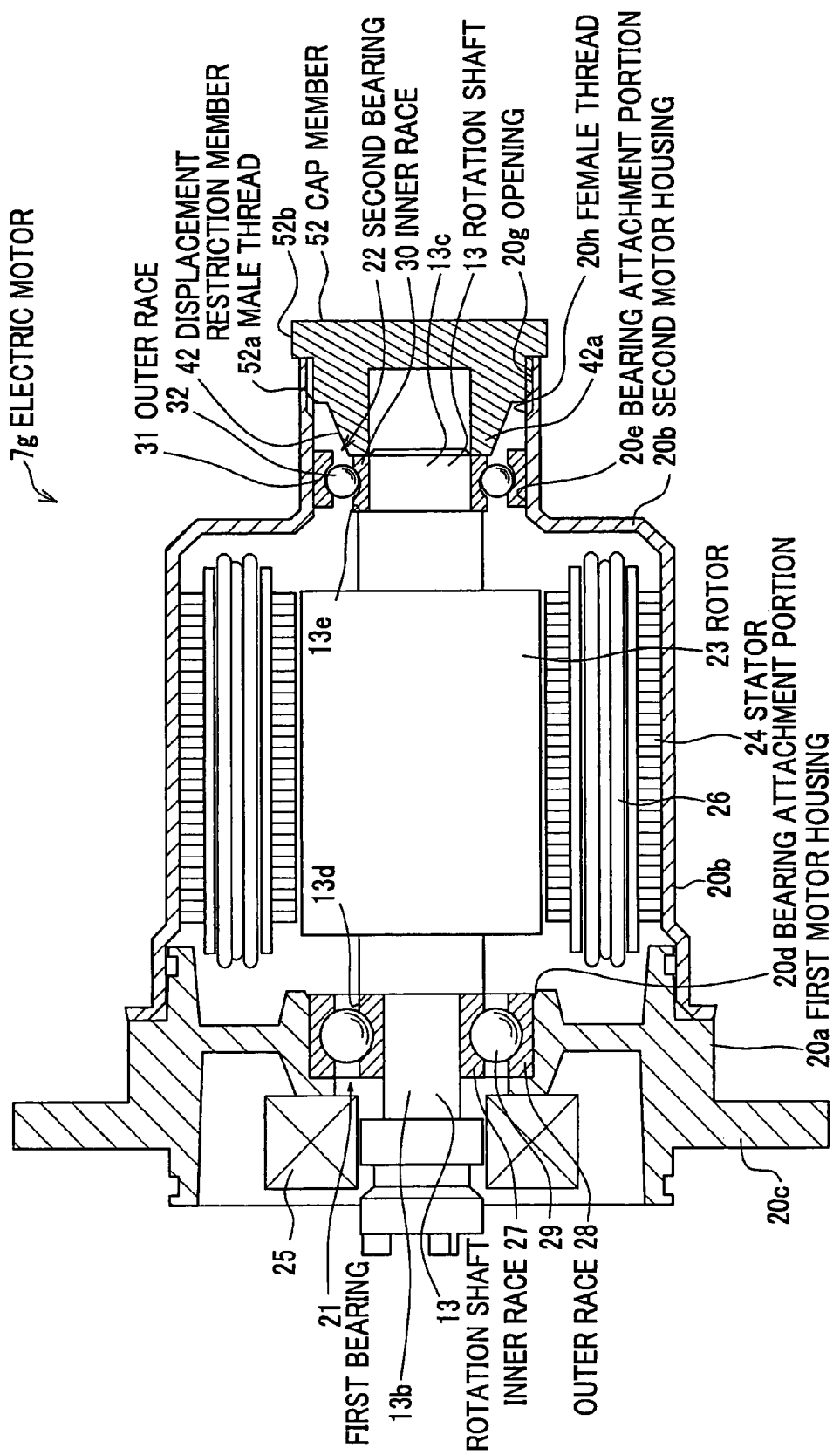
FIG. 12 is an enlarged schematic sectional view illustrating an electric motor according to an eighth embodiment.

As seen in FIG. 12, an electric motor 7g according to this preferred embodiment is configured such that when compared with the displacement restriction member 41 of the electric motor 7f according to the seventh embodiment as shown in FIG. 11, a displacement restriction member 42 has a pressing portion 42a which abuts on the inner race 30 of the second bearing 22.

In this preferred embodiment, the cap member 52 is made of a material such as metal and synthetic resin. The cap member 52 is integrally formed with a male thread (threaded portion) 52a which allows a screwing engagement with the female thread (threaded portion) 20h, the displacement restriction member 42 having the pressing portion 42a at its distal end which abuts on the inner race 30, and a head portion 52b.

As described above, the displacement restriction member 42 integral with the cap member 52 may abut on the inner race 30 of the second bearing 22 to thereby prevent a displacement of the inner race 30 toward the inlet end of the opening 20g.

Ninth Embodiment

An electric motor of an electric power steering apparatus according to the ninth embodiment of the present invention will be described below. Like parts with the same functions as those previously described with reference to the electric motor of the electric power steering apparatus according to the first embodiment as shown in FIG. 3 and the electric motor of the electric power steering apparatus according to the sixth embodiment as shown in FIG. 10 are denoted by the same reference numerals, and detailed description thereof will be omitted.

Figure 13:
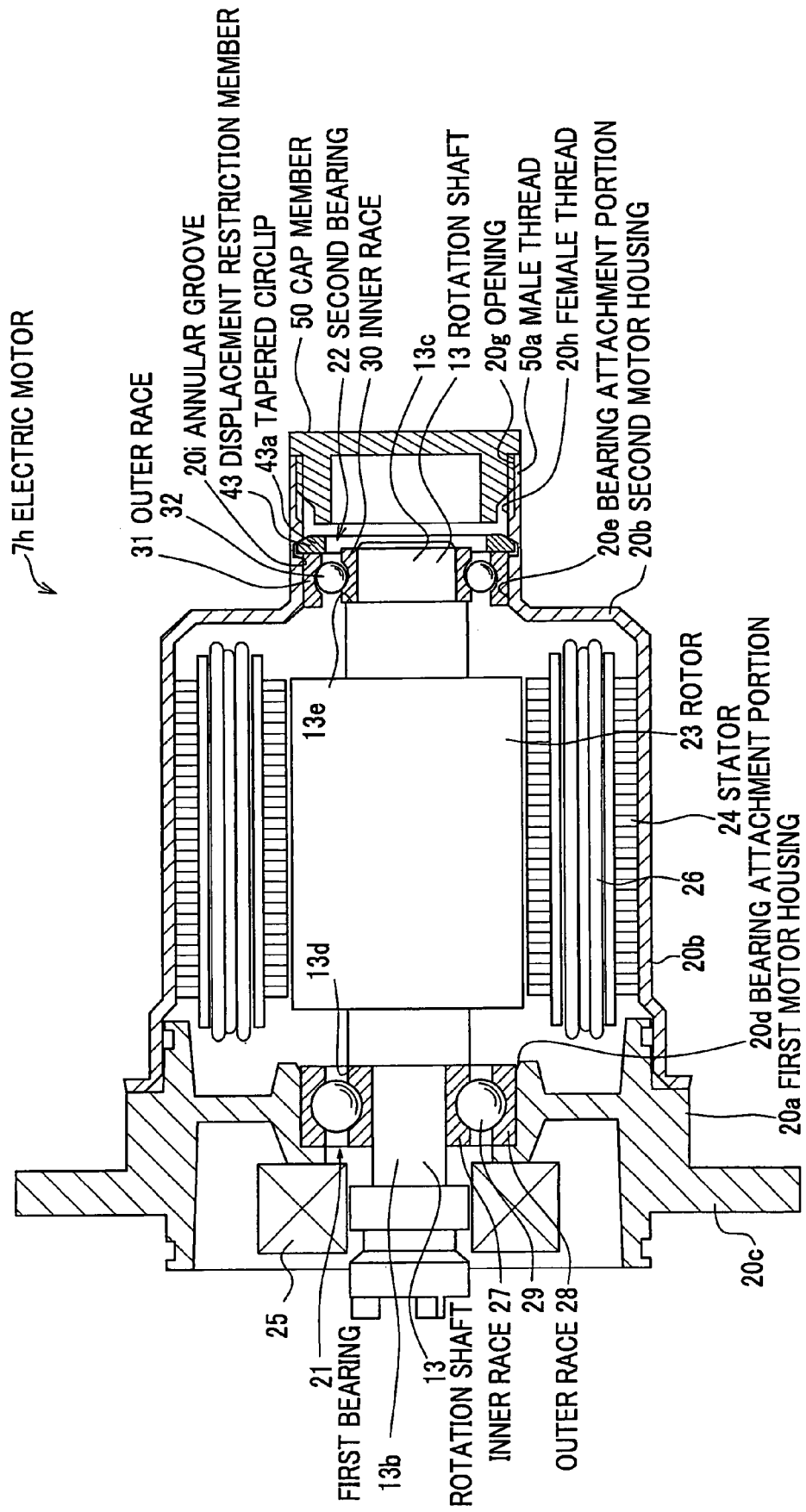
FIG. 13 is an enlarged schematic sectional view illustrating an electric motor according to a ninth embodiment.

As seen in FIG. 13, an electric motor 7h according to this preferred embodiment is configured such that when compared with the snap ring 40a of the displacement restriction member 40 of the electric motor 7e according to the sixth embodiment as shown in FIG. 10, an annular groove 20i is formed in the second motor housing 20b at the opening 20g of the bearing attachment portion 20e and a displacement restriction member 43 is formed by a tapered circlip 43a fitted into the annular groove 20i.

In this preferred embodiment, the annular groove 20i is formed adjacent to the outer race 31 of the second bearing 22 on a side closer to the opening 20g. The tapered circlip 43a is fitted into the annular groove 20i so as to prevent the outer race 31 from displacing toward the opening 20g.

As described above, it is possible to prevent a displacement of the outer race 31 toward the opening 20g by the provision of the tapered circlip 43a.

Modified Embodiment

The present invention may also be applicable to other structure (e.g., steer-by-wire) where the steering wheel in the steering system and the steerable wheels (front wheels) are mechanically separated and the electric motor generates the whole steering force required to turn the steerable wheels.

What is claimed is:

1. A power steering apparatus, comprising:
an electric motor having a rotation shaft comprising:
a motor housing into which the electric motor is accommodated, a rotor of the motor having the rotation shaft protruding from both ends thereof; and
at least one pair of rolling bearings positioned in the motor housing so as to surround the rotation shaft and rotatably supporting both ends of the rotation shaft, the pair of rolling bearings including a first rolling bearing and a second rolling bearing, the second rolling bearing being smaller than the first rolling bearing, the first rolling bearing being disposed on a base side portion of the rotation shaft, and the second rolling bearing being disposed on an apex side portion of the rotation shaft;
wherein each rolling bearing includes an inner race, an outer race, and rolling elements rotatably supported between the inner race and the outer race, the inner race of each rolling bearing being off-set outward in an axial direction of the rotation shaft relative to the outer race;
wherein the rotor is located between the pair of rolling bearings;
wherein the inner race is press fitted without any gaps in a radial direction onto an outer peripheral surface of the rotation shaft, and the outer race is press fitted without any gaps into a bearing attachment portion provided inside the motor housing; and
wherein the motor includes a stator fixed to the inner peripheral surface of the motor housing in a position opposite to the outer peripheral surface of the rotor, and the axial center of the rotor is offset in the axial direction toward the first rolling bearing relative to the axial center of the stator.

2. A power steering apparatus according to claim 1, wherein the electric motor is a brushless DC motor.

3. A power steering apparatus according to claim 1, wherein the electric motor applies power to a steering system as means of an electric power steering apparatus.

4. A power steering apparatus according to claim 2, wherein the electric motor applies power to a steering system as means of an electric power steering apparatus.

5. A power steering apparatus according to claim 1, wherein a ring-shaped elastic member is provided in a groove formed on a radial outside surface of at least one outer race of the pair of the rolling bearings and adjacent a groove-less surface of the motor housing.

* * * * *